United States Patent [19]

Ross

[11] Patent Number: 5,431,522
[45] Date of Patent: Jul. 11, 1995

[54] LOW PROFILE SCOOTER HOLDER

[76] Inventor: Robert E. Ross, 9822 San Sabastian Way, Port Richey, Fla. 34668

[21] Appl. No.: 259,716

[22] Filed: Jun. 14, 1994

[51] Int. Cl.⁶ .......................... B60R 9/042; B60R 9/06
[52] U.S. Cl. ................................ 414/462; 414/540; 224/497; 224/521; 410/30
[58] Field of Search ............. 414/240, 462, 540, 921; 410/6, 30; 224/42.03 B, 42.07, 42.08

[56] References Cited

U.S. PATENT DOCUMENTS

| | | | |
|---|---|---|---|
| 4,400,129 | 8/1983 | Eisenberg et al. | 414/462 |
| 4,705,448 | 11/1987 | Mungons | 414/462 |
| 5,011,361 | 4/1991 | Peterson | 414/462 |
| 5,122,024 | 6/1992 | Stokes | 414/462 |
| 5,137,411 | 8/1992 | Eul et al. | 414/462 |

*Primary Examiner*—Michael S. Huppert
*Assistant Examiner*—Douglas A. Hess
*Attorney, Agent, or Firm*—Joseph C. Mason, Jr.; Ronald E. Smith

[57] ABSTRACT

A scooter holder having a low profile is attached to the trailer hitch of a vehicle. The attachment member is adjustable and invertable so that the scooter holder may be used with vehicles of differing heights. The holder includes a scooter supporting platform that is in a raised and folded configuration when it is not supporting a scooter, and which when raised returns to its folded configuration if no scooter is atop the platform and which remains unfolded when raised with a scooter on the platform. Throwing a switch causes the platform to lower and unfold in a gradual, continuous motion until it reaches a fully unfolded, lowered position where a scooter can be driven onto it. Throwing the switch with a scooter on the platform causes the holder to lift the scooter to a desirable height. The platform pivots about a fulcrum when lifted empty, but the fulcrum is bypassed when the platform is lifted while supporting a scooter. A wheelchair is carried by the scooter holder when the holder is in its raised and folded configuration.

10 Claims, 7 Drawing Sheets

LOW PROFILE SCOOTER HOLDER

BACKGROUND OF THE INVENTION

1. Field of the Invention

This invention relates, generally, to a device that mounts to the trailing end of a road worthy vehicle for the transportation of a smaller vehicle, such as a scooter for a handicapped individual, that is not road worthy.

2. Description of the Prior Art

A person unable to walk or who experiences difficulty in walking may purchase a small, motorized vehicle known as a scooter which is suitable for use in malls or other public, off road places. Most commercially available scooters are too large to load into the trunk of a passenger car, however, so inventors have developed numerous scooter holder designs whereby a scooter may be mounted on the trailing end of a road worthy vehicle such as a passenger car, a station wagon, or the like. The primary problem with the earlier designs is that they have a high profile, i.e., they prevent the opening of a station wagon door, for example. They also suffer from structural and engineering problems.

What is needed, then, is a structurally sound, well-engineered scooter holder having a low profile. However, in view of the prior art at the time the present invention was made, it was not obvious to those of ordinary skill in this art how such a scooter holder could be provided.

SUMMARY OF THE INVENTION

The longstanding need for a well-designed, low profile scooter holder has now been fulfilled.

The novel apparatus includes a platform for supporting a scooter, an elongate drive means for raising and lowering said platform, a compartment through which said drive means extends, a base plate secured to a lowermost end of said drive means, a plate slideably secured to a bolt mounted to said platform, said base plate having a mounting projection that receives said bolt so that said platform is pivotal thereabout, a fulcrum member secured to said compartment about which said slideable plate and said platform pivot when said platform is raised or lowered and is not supporting a scooter, a bias means for positioning said fulcrum member and said slideable plate in vertical alignment with one another when no scooter is supported by said platform, and a bypass means for laterally displacing said slideable plate out of said vertical alignment with said fulcrum member when a scooter is supported by said platform so that said platform does not pivot when raised while supporting a scooter.

Thus it is understood that a primary object of this invention is to provide a scooter holder, for attachment to the trailer hitch of a vehicle, that has a low profile and which folds into a storage position automatically when raised without a load and which remains unfolded when carrying a load.

Another object is to provide such a holder that deploys a scooter-supporting platform in a slow, continuous motion when the platform is being lowered.

Another object is to provide an automatic means for clamping a scooter down when supported by the platform.

Still another object is to provide a scooter holder having means for supporting a folded wheelchair when not in use as a scooter holder.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
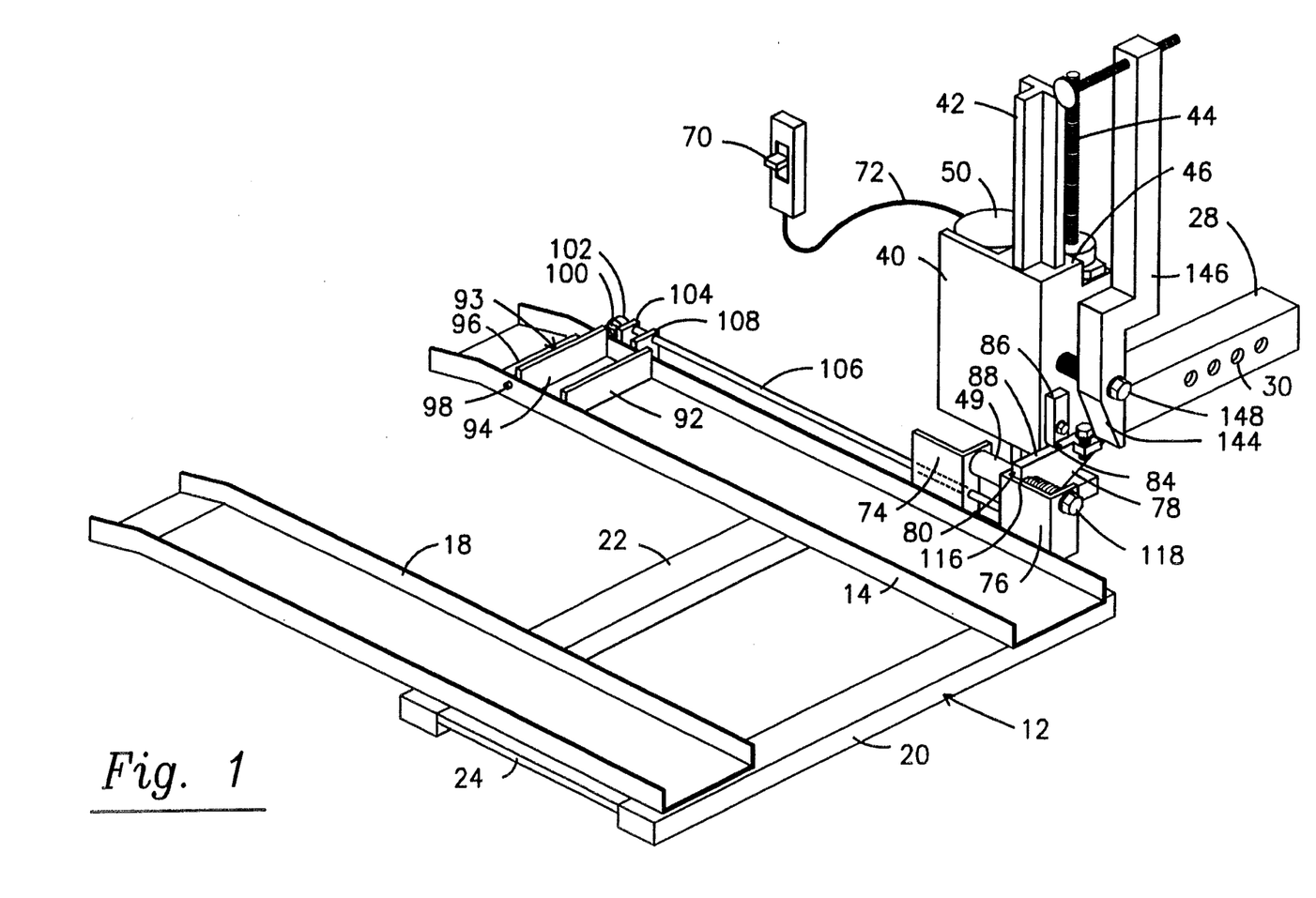
FIG. 1 is a perspective view of the novel scooter holder when in its unfolded, raised position.

Referring now to FIG. 1, it will there be seen that an illustrative embodiment of the invention is denoted as a whole by the reference numeral 10.

Scooter holder 10 includes a scooter support platform 12 that includes a pair of elongate channel-shaped tracks 14 and 18 for receiving the wheels of a four-wheeled scooter. A middle track, not shown, is provided in an embodiment for three-wheeled scooters. In FIG. 1, platform 12 is raised with respect to a ground surface.

Transversely disposed support braces 20 and 22 underlie said tracks, support them, and maintain them in their parallel alignment with one another. Additional support is provided by longitudinally aligned support braces 24 (FIG. 1) and 26 (FIG. 2).

Trailer post 28, at the right end of FIG. 1, includes plural openings 30. Those openings 30 may be selectively aligned with openings 32 formed in trailer hitch housing 34 (FIG. 2) when post 28 is telescopically received therewithin. A bolt 36 is used to lock the post and housing together when an appropriate connection has been made, it being understood that the connection may be different as between vehicles of differing constructions. Trailer hitch housing is secured to road worthy vehicle 35 which may or may not have a bumper 37.

Figure 2:
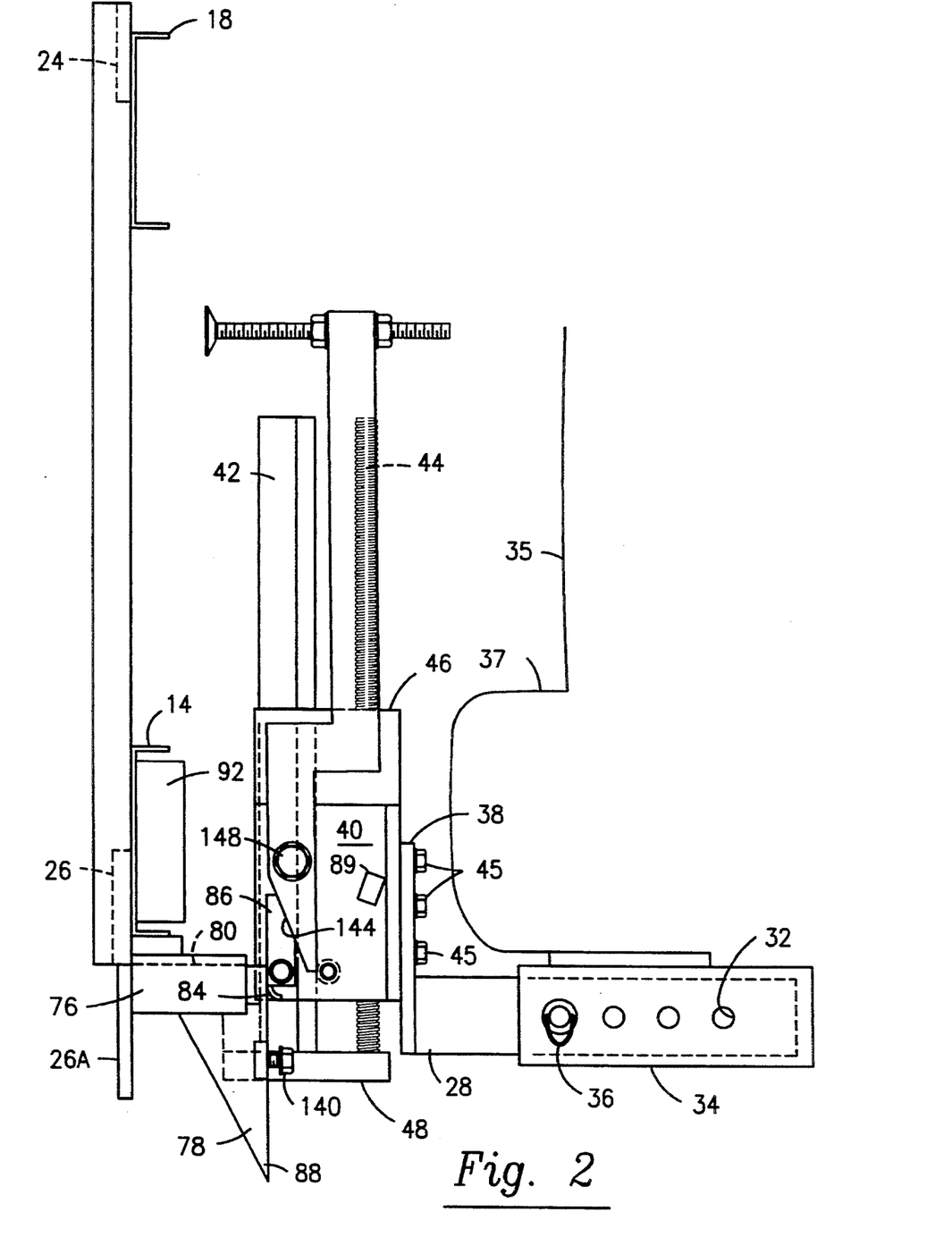
FIG. 2 is a side elevational view of the holder in its raised and folded position.

It should also be observed in FIG. 2 that post 28 is secured to plate 38, and that plate 38 is secured to compartment 40 by a plurality of bolts 42. Significantly, compartment 40 includes a plurality of bolt-receiving openings formed in its rearward side so that said compartment may be mounted higher or lower relative to the position depicted in FIG. 2. Plate 38 may also be inverted to accommodate most motor homes and high ride vehicles. This enables attachment of the novel assembly to vehicles of widely differing heights.

Compartment 40 is hollow and receives therein a guide means in the form of a T-shaped guide bar 42 and a drive means in the form of an elongate drive screw 44. When scooter support platform 12 is raised relative to ground, said guide bar and drive screw extend above top wall 46 of said compartment as depicted in FIGS. 1 and 2.

The lowermost ends of the guide bar and drive screw are fixedly secured to base plate 48. Note that base plate 48 includes an integrally formed mounting projection 49; platform 12 is pivotally connected to projection 49 through an interconnecting means which includes a free floating bolt 118 (FIG. 3) with a threaded end fixedly secured by a nylock nut and which extends sequentially through a first wall of channel 76, spring 116, slideable plate 78, a second wall of channel 76, mounting projection 49, and angle 74. The free-floating bolt allows platform 12 to conjointly rotate with slideable plate 78 into its folded position.

Figures 4, 5:
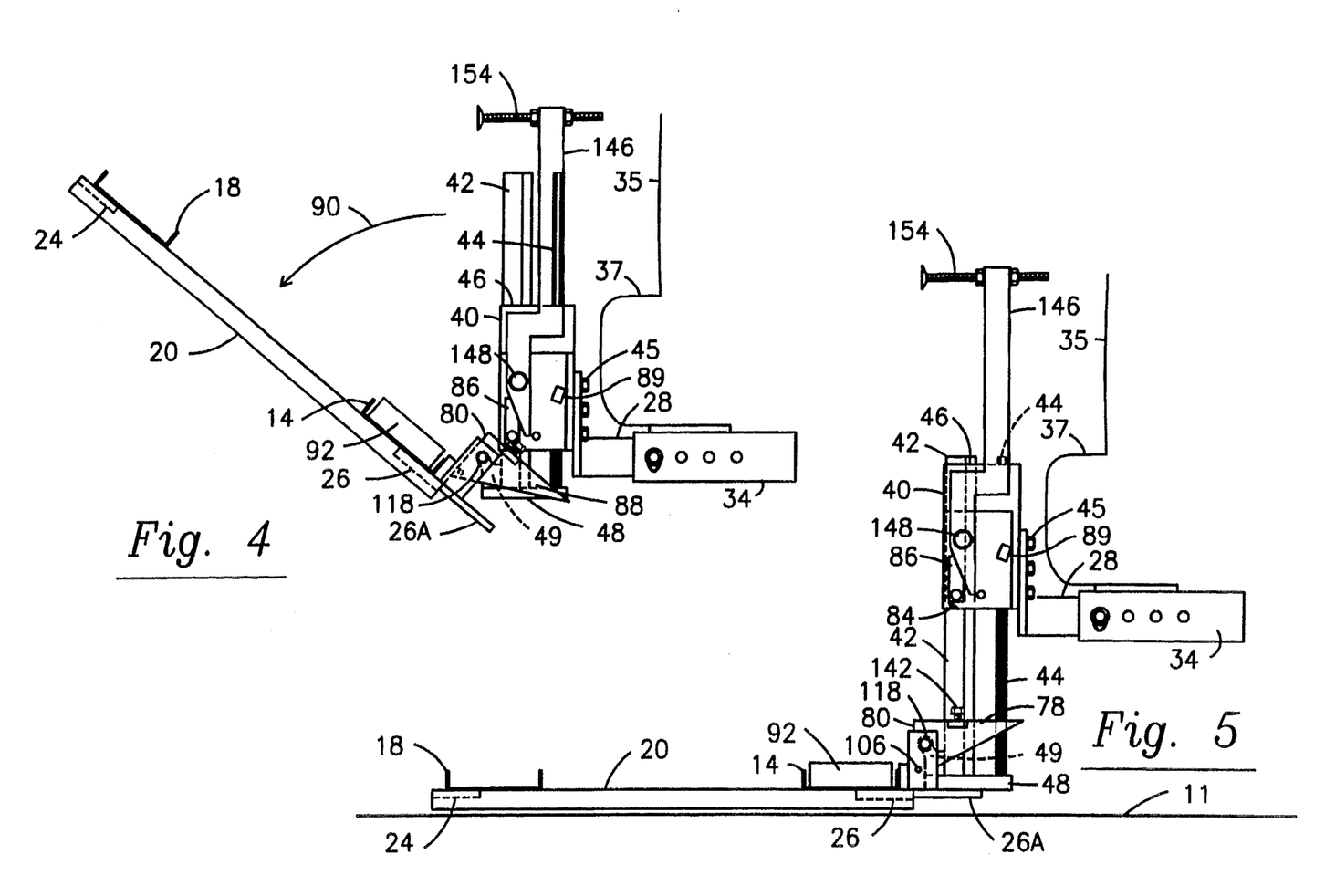
FIG. 4 is a side elevational view of the holder in its raised position, showing the scooter support member about half way unfolded.
FIG. 5 is a side elevational view depicting the holder in its lowered, unfolded configuration.

FIG. 5 depicts said guide bar 42 and drive screw 44 in their common lowermost position. Note how base plate 48 overlies support brace 26A when said guide bar, drive screw, and base plate are in their common lowermost position. The abutment of base plate 48 and brace 26A maintains scooter support platform 12 in a generally horizontal plane as base plate 48 moves upwardly from its FIG. 5 position.

Figure 3:
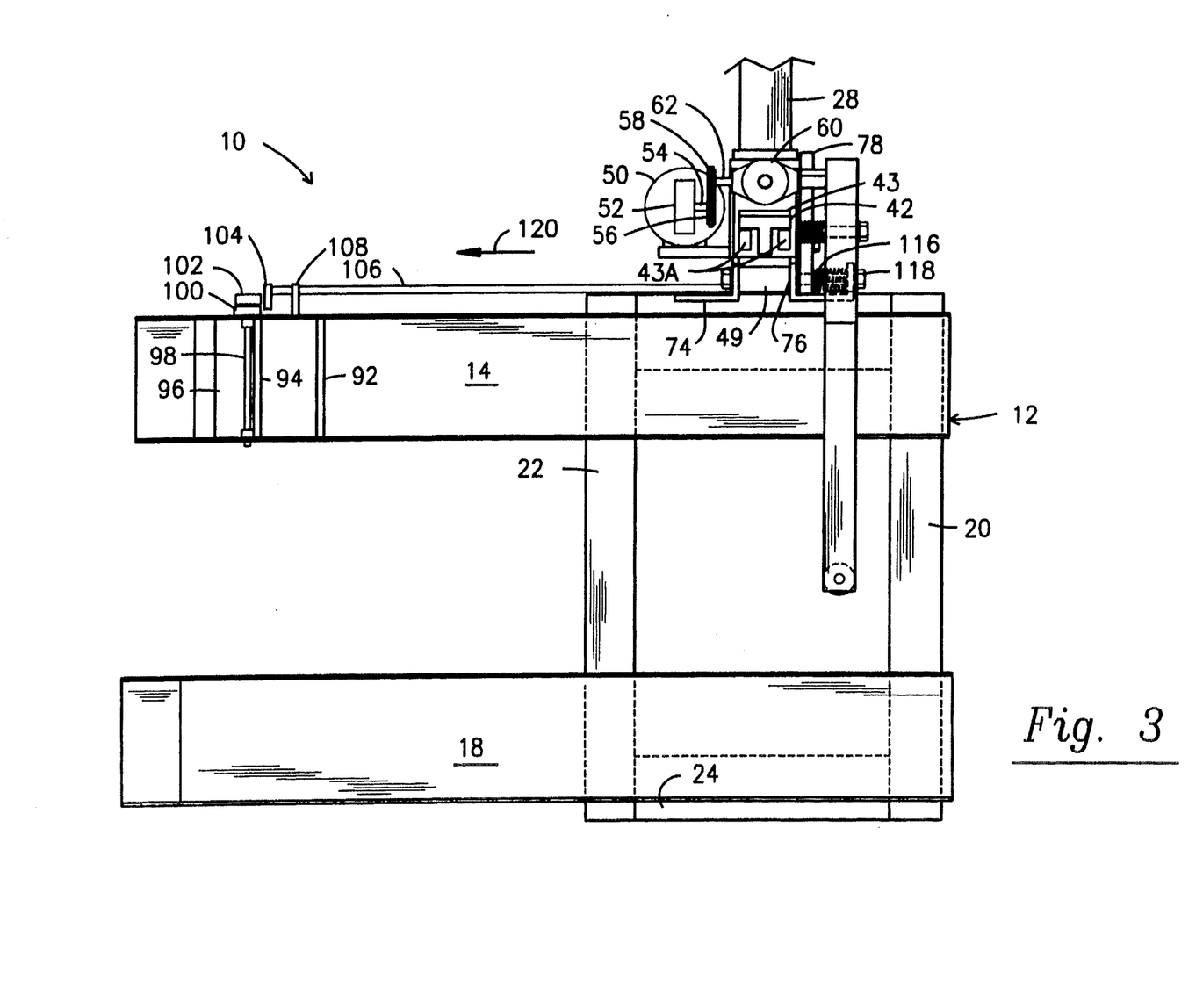
FIG. 3 is a top plan view of the holder in its unfolded configuration.

FIG. 3 best depicts the parts that effect upward and downward travel of said guide bar and drive screw; it also depicts wear plates 43 and 43A which are secured to the side plates of housing 40. Motor 50 is enclosed on top and has a vertical output shaft with a worm gear that drives a gear keyed to shaft 54. Shaft 54 rotates a clutch and sprocket assembly 56 that is coupled by a chain to drive sprocket 58 which is keyed to shaft 62. Device 60 causes relative rotation between itself and nonrotating drive screw 44; accordingly, drive screw 44 is driven upwardly or downwardly depending upon the direction of rotation of device 60. Drive device 60 is sold under the trademark DUFF NORTON drive. Motor 50 is activated by throwing switch actuator 70 (FIG. 1) which is in electrical communication with said motor through conductor 72.

FIGS. 1-4 best depict the structure which interconnects scooter support platform 12 and base plate 48. Angle member 74 and channel member 76 are welded or otherwise fixedly secured to brace 26 in laterally spaced relation to one another. Mounting projection 49, formed integrally with base plate 48, receives bolt 118 which extends through angle 74 and channel 76 as best depicted in FIG. 3, and as mentioned earlier. A first end or base 80 of triangular slideable plate 78 is slideably secured to bolt 118 and is received at least partially within the channel defined by bracket 76. It is held by bias means 116 into its FIG. 3 position.

Pivotal displacement of slideable plate 78 and hence of platform 12 is effected by abutting engagement of a free end of slideable plate 78 with arcuate finger 84 that depends from fulcrum member 86 that is welded to compartment 40. FIG. 1 depicts side 88 of slideable plate 78 in abutting relation to arcuate finger 84, but pivoting of said arcuate plate about the fulcrum defined by said arcuate finger 84 has been completed and scooter support platform 12 has been fully deployed. FIG. 2 depicts side 88 of slideable plate 78 in its vertical position and in abutting relation to fulcrum member 86; note that guide bar 42 and drive screw 44 are near their common uppermost position in said FIG. 2. In FIG. 4, said guide bar 42 and drive screw 44 are disposed downwardly of their FIG. 2 position, and in FIG. 5, side 88 of slideable plate 78 is no longer abutting fulcrum member 86. Under the influence of gravity, scooter support platform 12 is deploying or unfolding in a gradual, continuous motion due to the continuous engagement of slideable triangular plate 78 and the fulcrum member; specifically, side 88 is pivoting about arcuate finger 84. As base plate 48 continues to be lowered as guide bar 42 and drive screw 44 are lowered, platform 12 continues to gradually and smoothly deploy in the direction of arrow 90. When platform 12 is fully unfolded, as depicted in FIG. 5, guide bar 42 and drive screw 44 are in their common lowermost position and base plate 48 prevents further pivoting of plate 26 and hence of platform 12. When in its FIG. 5 position, a scooter on ground 11 may be driven onto said platform.

It is important to note that side 88 of slideable plate 78 pivotally engages arcuate finger 84 in the manner described only when scooter support platform 12 is being folded or unfolded with no scooter positioned thereatop.

Figure 8:
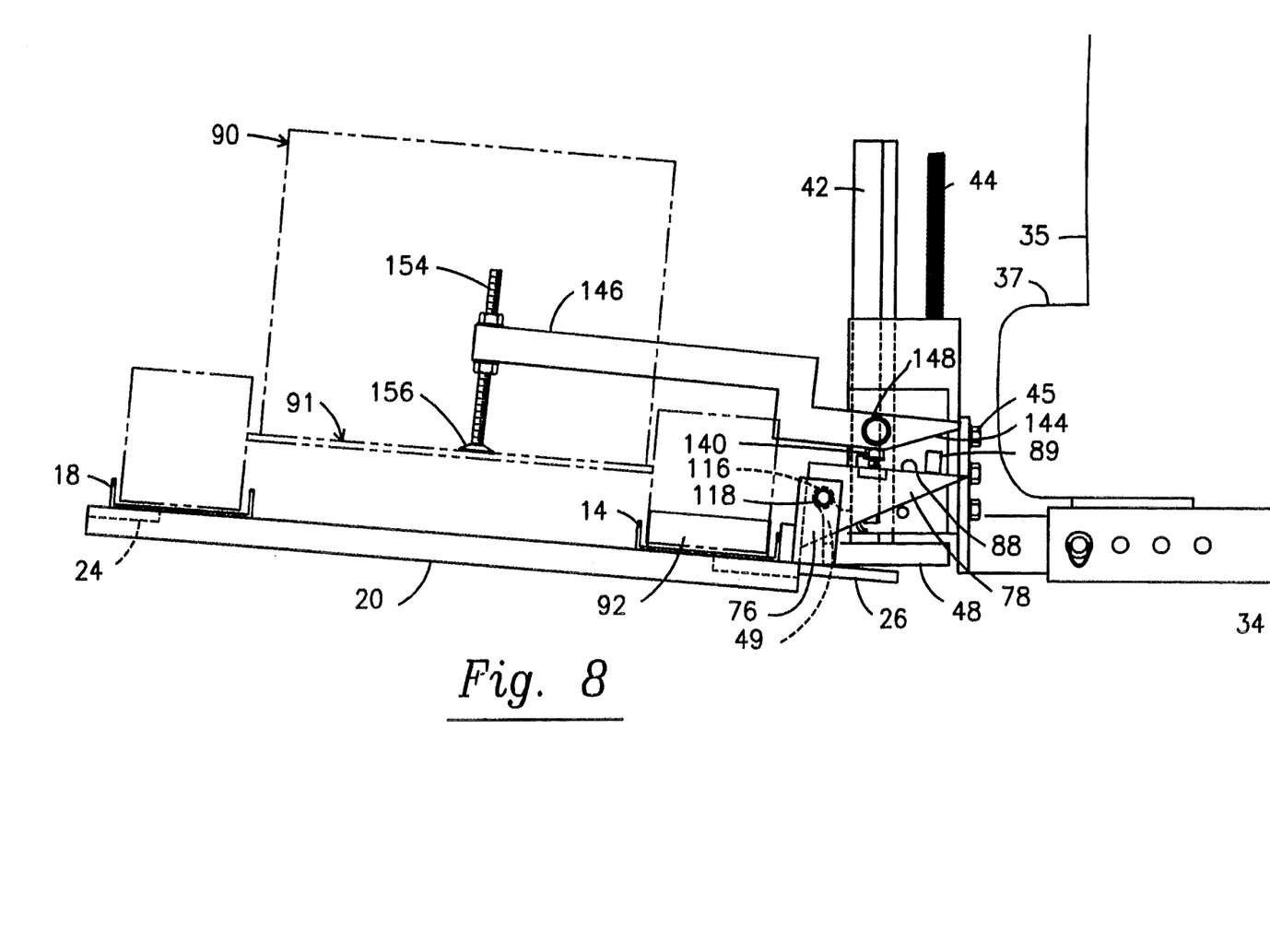
FIG. 8 is a side elevational view depicting the support platform in its fully raised configuration and with the clamping mechanism fully lowered into position.

When a scooter, represented by phantom lines 90 in FIG. 8, is positioned atop support platform 12, said platform is raised to its uppermost level as depicted in FIG. 8, platform 12 is not folded, i.e., the FIG. 2 position of platform 12 is attained only when the apparatus 10 is not holding a scooter.

Figure 9:
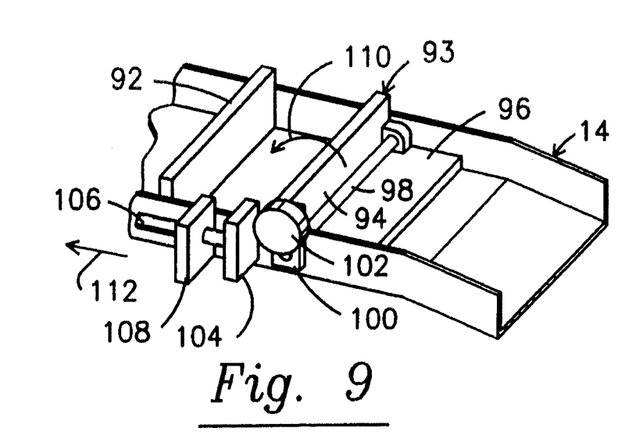
FIG. 9 is a perspective view of a part of the mechanism that bypasses the fulcrum when a scooter is supported on the platform.

A highly novel structure that prevents the pivoting of slideable plate 78 about arcuate finger 84 when a scooter is on platform 12 is depicted in FIGS. 1, 3, 6, 7, and 9. The structure is shown in repose in FIG. 1. A scooter wheel stop plate 92 is bolted in channel 14 in upstanding configuration and performs the functions its name expresses. A bypass plate 93 has two parts 94 and 96 that are welded to one another at a ninety degree angle relative to one another so that when said bypass plate is in repose, plate 94 is upstanding and plate 96 overlies the bottom wall of channel 14 as depicted in FIG. 1. Bypass plate 93 is pivotally mounted about pivot pin 98. Pivot pin 98 is best depicted in FIG. 9; there it will be seen that said pin extends transversely across channel 14. Bypass plate 93 is secured to a bypass assembly that includes plate 100 which is fixedly secured to pin 98, wall 94, and wall 96. Wheel 102 is rotatably secured to plate 100. Wheel 102 is positioned contiguous to a connecting means in the form of movable plate 104 and said movable plate 104 is mounted to movable rod 106 which passes through a central opening formed in immovable plate 108. Thus, rotation of wall 94 in the direction indicated by directional arrow 110 simultaneously displaces plate 100 and hence wheel 102 toward movable plate 104. Such motion displaces rod 106 in a direction coincident with its longitudinal axis, as indicated by directional arrow 112. At the opposite end of rod 106, as depicted in FIG. 3, said rod extends through openings formed in brackets 74, 76 and terminates at slideable plate 78 to which it is fixedly secured. A bias means 116 is positioned within bracket 76 in ensleeving relation to a bolt 118; said bias means 116 biases rod 106 in the direction of directional arrow 120 (FIG. 3) and hence maintains movable plate 104 in its spaced relation to welded assembly 84 and 86 when the system is in repose as depicted in said FIG. 3.

Figure 6:
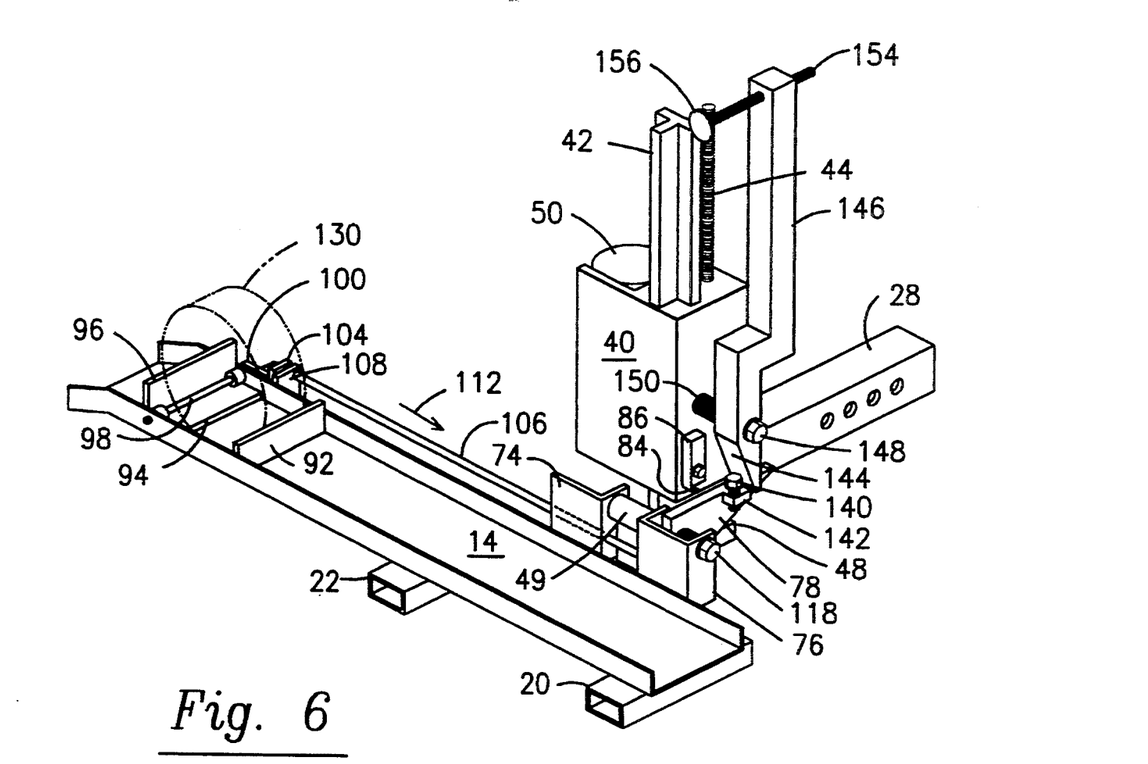
FIG. 6 is a detailed perspective view of a part of the scooter support platform, depicting how a wheel of the scooter activates a fulcrum bypass means when a scooter is supported by said support platform.
Figure 7:
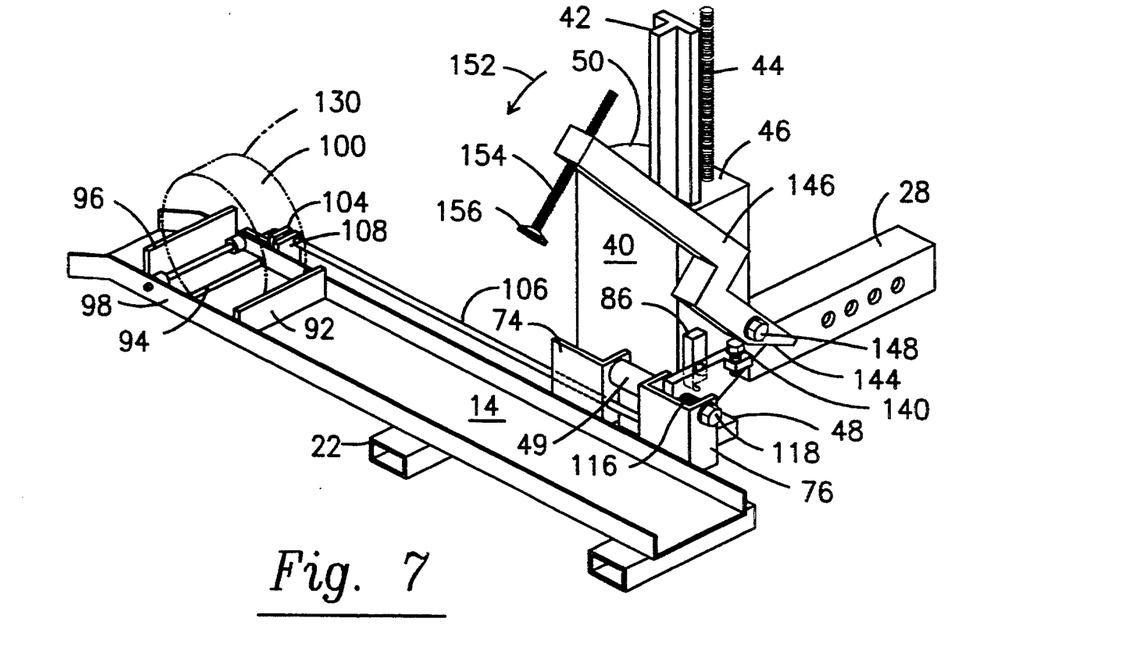
FIG. 7 is a view similar to the view of FIG. 6, but showing the scooter support platform raised to a higher elevation and depicting the concomitant lowering of a clamping mechanism that holds the scooter down.

Bias means 116 is compressed and the apparatus is therefore not in repose in FIGS. 6 and 7. A scooter having a left rear wheel 130 has been driven onto platform 12; wheel 130 has caused pivotal displacement of plate 94 of the bypass means so that said plate overlies the bottom wall of channel 14 and plate 96 has pivoted into the depicted upstanding configuration, thereby displacing rod 106 in the direction indicated by directional arrow 112 as aforesaid. A careful comparison of FIGS. 1 and 6 will indicate that slideable plate 78 has slid laterally to the right upon displacement of said rod 106 in direction 122 and is therefore no longer in vertical alignment with the fulcrum member; note that side 88 of slideable plate 78 is directly below arcuate finger 84 in FIG. 1 and that it is not under said arcuate finger in FIG. 6. Thus, as platform 12 is raised into its FIG. 7 position, slideable plate 78 bypasses arcuate finger 84 as clearly depicted in said FIG. 7; as a result, platform 12 does not pivot about said arcuate finger as it does when the apparatus is in repose. Instead, as platform 12 is raised from its FIG. 6 to its FIG. 7 position, bolt 140, which is carried in a laterally extending ledge 142 formed integrally with slideable plate 78, slidingly bears against inclined surface 144 at the lower end of a clamping means in the form of clamp arm 146 that is pivotally mounted about pivot point 148 to compartment 40. A torque spring 150 maintains clamp arm 146 in its upright position as depicted in FIG. 6 until said bolt 142 slidingly bears against said inclined surface 144 as platform 12 is raised. The bearing of the bolt 142 against said surface 144 actuates the clamping means because bolt 142 overcomes the bias exerted by torque spring 150 and causes clamp arm 146 to pivot about pivot point 148 in the direction indicated by directional arrow 152. Clamp arm 146 carries elongate hold down screw 154 that terminates in a retainer 156.

As depicted in FIG. 8, full rotation of clamp arm 146 brings retainer 156 into retaining relation to the floorboard 91 of scooter 90, thereby holding it down. This is the position of the apparatus when scooter 90 is being transported over public highways by road worthy vehicle 35. Note stop member 89 (FIG. 2) which is immovably secured to compartment 40; it abuts side 88 of slideable plate 78 and thereby prevents overrotation of said slideable plate.

When the scooter is driven off of platform 12, bias means 116 urges connecting rod 106 in a direction opposite to direction 112,, i.e., in direction 120, and slideable plate 78 returns to its repose position beneath arcuate finger 84 so that said slideable plate 78 and hence platform 12 will pivot thereabout as the platform is raised or lowered in its empty configuration. Clamping arm 146, disengaged by bolt 142, returns to its upright position under the bias of torque spring 150.

Figure 10:
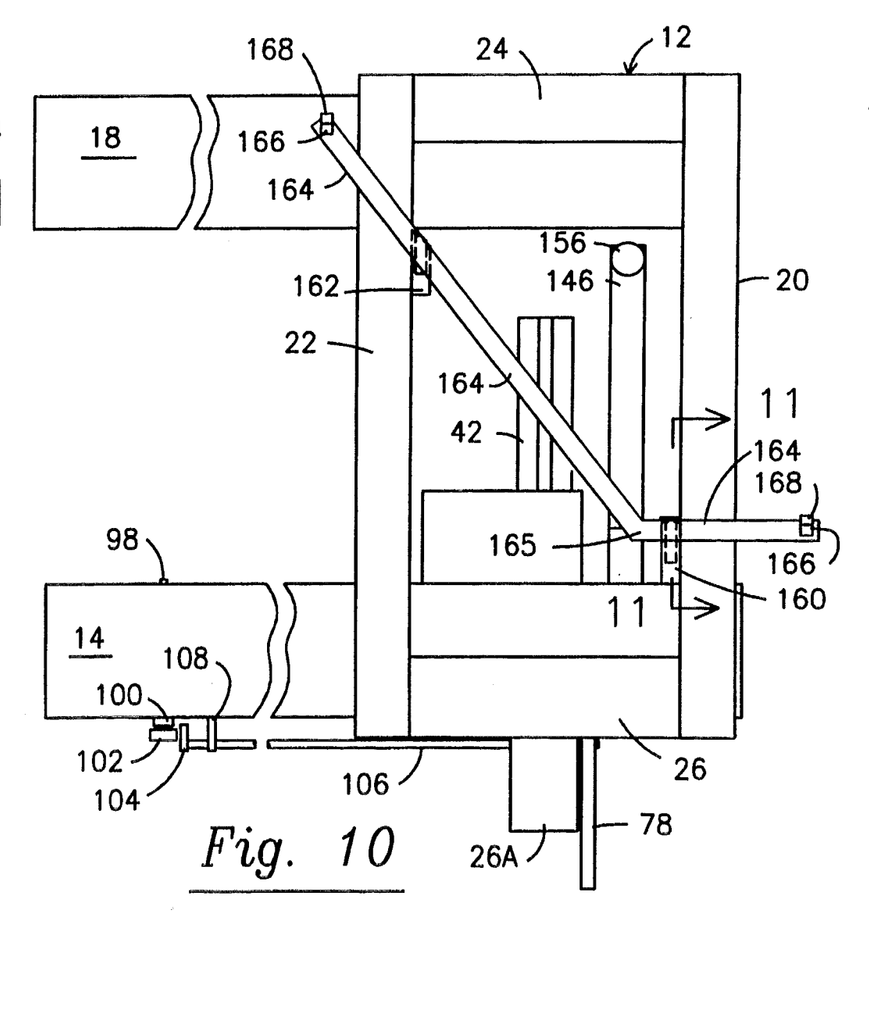
FIG. 10 is a front elevational view of the holder when fully raised and fully folded.
Figure 11:
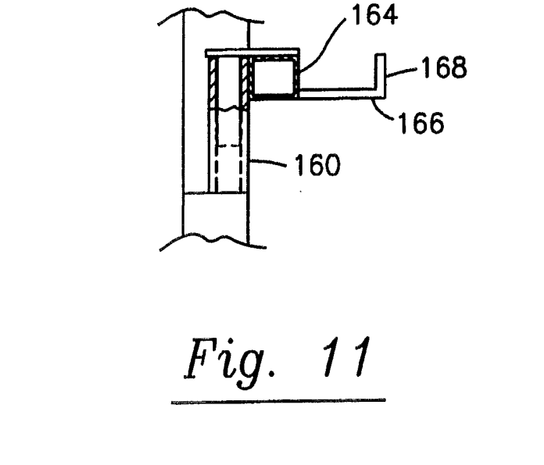
FIG. 11 is a sectional view taken along line 11—11 in FIG. 10.

Still another feature is depicted in FIGS. 10 and 11. In FIG. 10, there is no scooter on platform 12 and said platform is folded into its storage configuration. A pair of square mounting tubes 160, 162 are fixedly secured to braces 20, 22, respectively, and an elongate square tube 164 is welded or otherwise affixed thereto. Elongate square tube 164 has a bend 165 formed therein so that it includes a truncate horizontal part and an elongate diagonal part. An L-shaped hanging bracket having parts 166 and 168 is secured to opposite ends of elongate square tube 164; these hanging brackets support a folded wheelchair. The handlegrips of a wheelchair may be suspended from the hanging bracket on the innermost sides of channels 20 and 22 of platform 12, and the caster assembly thereof may be suspended from the hanging bracket at the opposite end of said elongate square tube.

This invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. An apparatus for attachment to a trailer hitch of a vehicle, comprising:

a platform for supporting a scooter;
an elongate drive means for raising and lowering said platform;
a compartment through which said drive means extends;
a base plate secured to a lowermost end of said drive means, said base plate having a mounting projection;
an elongate free-floating bolt mounted to said platform and extending through said mounting projection so that said platform is rotatable about said free-floating bolt;
a slideable plate slideably secured to said free-floating bolt;
a fulcrum member secured to said compartment about which said slideable plate and said platform pivot when said platform is raised or lowered and is not supporting a scooter;
a bias means that ensleeves said free-floating bolt;
said bias means urging said slideable plate into vertical alignment with said fulcrum member when no scooter is supported by said platform; and
bypass means for laterally displacing said slideable plate out of said vertical alignment with said fulcrum member when a scooter is supported by said platform so that said platform does not pivot when raised while supporting a scooter.

2. The apparatus of claim 1, wherein said bypass means includes a bypass plate pivotally mounted on said platform and a bypass assembly associated therewith, means for biasing said bypass plate into a position of repose where said bypass plate is in upstanding relation to said platform, and connecting means connected to said bypass plate through said bypass assembly that laterally displaces said slideable plate away from said fulcrum member when said bypass plate is rotated out of its position of repose so that subsequent lifting of said platform does not result in rotation of said platform about said fulcrum member.

3. The apparatus of claim 2, wherein said means for biasing said bypass plate into its position of repose includes said bias means that urges said slideable plate into vertical alignment with said fulcrum member, a connecting rod having a first end secured to said slideable plate and a second end disposed in closely spaced relation to said bypass assembly, said bypass assembly being conjointly pivotable with said bypass plate so that pivoting of said bypass assembly by said slideable plate bias means positions said bypass plate into its upstanding position of repose, and whereby pivoting of said bypass plate out of its position of repose effects simultaneous and corresponding rotation of said bypass assembly and hence displacement of said connecting rod and compression of said slideable plate bias means and vertical misalignment of said fulcrum member and said slideable plate.

4. The apparatus of claim 2, further comprising a stop plate fixedly secured to said platform in upstanding relation thereto, said stop plate being spaced apart from said bypass plate to enable a scooter wheel to be positioned between said bypass plate and said stop plate, said stop plate maintaining said scooter wheel atop said bypass plate when a scooter is supported by said platform.

5. The apparatus of claim 1, further comprising clamping means for clamping a scooter onto said platform, clamping biasing means for biasing said clamping means into an upright position of repose, clamping activation means for overcoming said clamping biasing means and for displacing said clamping means into clamping relation to a scooter supported by said platform, and means for activating said clamping activation means only when a scooter is supported by said platform and said platform has been raised to an elevated position by said drive means.

6. The apparatus of claim 5, wherein said clamping means includes an elongate arm pivotally mounted to said compartment, said elongate arm having an inclined surface formed in its lowermost end, an inclined surface engaging means being mounted on said slideable plate, and said inclined surface engaging means being vertically aligned with said inclined surface when said bypass means has laterally displaced said slideable plate away from said fulcrum member so that raising said platform and hence said slideable plate causes said inclined surface engaging means to bear against said inclined surface, thereby effecting pivoting of said clamping arm relative to said compartment until said clamping arm engages said scooter to clamp it to said platform.

7. The apparatus of claim 1, further comprising a guide means disposed in parallel relation to said drive means, said guide means extending through said compartment and having a lowermost end secured to said base plate, said guide means cooperating with said drive means to enable facile raising and lowering of said platform.

8. The apparatus of claim 7, further comprising a motor means for driving said drive means upwardly and downwardly, and a chain and sprocket means for effecting upward and downward travel of said drive means.

9. The apparatus of claim 8, wherein said drive means is a screw and wherein said guide means effects said upward and downward travel of said screw without causing said screw to rotate about a longitudinal axis of symmetry thereof.

10. The apparatus of claim 1, further comprising at least one wheelchair-supporting bracket fixedly secured to an underside of said platform for hanging a wheelchair thereon when said scooter holder is in a raised and folded configuration.

* * * * *